United States Patent [19]

Inoue

[11] Patent Number: 5,252,871

[45] Date of Patent: Oct. 12, 1993

[54] ROLLER THRUST BEARING STRUCTURE FOR SPINDLE SHAFT

[75] Inventor: Kazuhiko Inoue, Houya, Japan

[73] Assignee: TEAC Corporation, Tokyo, Japan

[21] Appl. No.: 742,836

[22] Filed: Aug. 8, 1991

[30] Foreign Application Priority Data

Aug. 11, 1990 [JP] Japan .................... 2-212093

[51] Int. Cl.⁵ .................... H02K 7/08; H02K 1/22
[52] U.S. Cl. .................... 310/90; 310/268
[58] Field of Search .................... 310/90, 268; 384/615, 384/609

[56] References Cited

U.S. PATENT DOCUMENTS

| | | | |
|---|---|---|---|
| 2,138,730 | 11/1938 | Cooper | 384/615 |
| 2,467,870 | 4/1949 | Stephenson | 384/615 |
| 4,259,043 | 3/1981 | Hidden et al. | 384/609 |
| 4,675,763 | 6/1987 | Sakai et al. | 360/47 |

FOREIGN PATENT DOCUMENTS

| | | | |
|---|---|---|---|
| 0148846 | 6/1988 | Japan | 310/90 |
| 280645 | 11/1990 | Japan | 310/90 |

Primary Examiner—Emanuel T. Voeltz
Assistant Examiner—C. LaBalle
Attorney, Agent, or Firm—Michael N. Meller

[57] ABSTRACT

A roller thrust bearing structure rotatably supports a spindle shaft on a frame and includes a circular table which is fixed to the spindle shaft as a flange. A radial bearing is fixed on the frame for rotatably supporting the spindle shaft in a radial direction of the spindle shaft. A support member is located between the table and the frame for rotatably supporting the table on the frame so as to support the spindle shaft in a thrust direction of the spindle shaft. The thrust direction is perpendicular to the radial direction of the spindle shaft. The roller thrust bearing structure for a spindle shaft is used in a thin disc drive.

2 Claims, 2 Drawing Sheets

ROLLER THRUST BEARING STRUCTURE FOR SPINDLE SHAFT

BACKGROUND OF THE INVENTION

The present invention generally relates to bearing structures, and more particularly to a bearing structure for a spindle shaft and suited for use in equipments which are relatively thin.

In a disk unit which records and/or reproduces information on/from a flexible disk, the disk is clamped at a predetermined position and rotated by a spindle shaft. The spindle shaft is rotatably supported on a frame of the disk unit. Conventionally, a bearing structure for the spindle shaft is constructed as shown in FIGS. 1 or 2, for example.

A conventional bearing structure 10 shown in FIG. 1 is the so-called direct drive type in which a spindle shaft 11 is integrally formed on a rotary shaft of a motor. According to this bearing structure 10, two radial bearings (ball bearings) 12 and 13 are arranged to confront each other in an axial direction of the spindle shaft 11. Outer rings 12a and 13a of the respective radial bearings 12 and 13 are fixed to a frame 14. Inner rings 12b and 13b of the respective radial bearings 12 and 13 are fixed to the spindle shaft 11. A spring 15 supports the spindle shaft 11 along a thrust direction and also applies a pressure to the spindle shaft 11 in the thrust direction. The thrust direction is perpendicular to the radial direction in which the radial bearings 12 and 13 support the spindle shaft 11. Play of the spindle shaft 11 in the axial direction is prevented by the action of the spring 15. A table 16 is integrally formed on the spindle shaft 11, and a disk (not shown) is placed on this table 16. In addition, a drive pin 17 is provided on the table 16. This drive pin 17 is used to position the disk on the table 16 and to rotationally drive the disk.

According to the bearing structure 10, the load in the radial direction is received by the radial bearings 12 and 13, and the load in the thrust direction is received by the spring 15. In addition, the play of the spindle shaft 11 indicated by an arrow a in FIG. 1 is prevented by spacing apart the two radial bearings 12 and 13.

On the other hand, a conventional bearing structure 20 shown in FIG. 2 supports a spindle shaft 22. A table 21 is fixed to the spindle shaft 22, and a belt 23 is wrapped around a pulley part 21a which is formed on an outer peripheral part of the table 21. The spindle shaft 22 is rotated by driving the belt 23.

The load in the radial direction of the spindle shaft 22 is received by a metal bearing 24. This metal bearing 24 is fixed on a frame 26. In addition, a washer 25 is interposed between the metal bearing 24 and the table 21 to receive the load in the thrust direction. A stopper 27 is provided to prevent the spindle shaft 22 from slipping upwardly. A washer 28 is interposed between the stopper 27 and the metal bearing 24.

According to this bearing structure 20, a horizontal load is applied on the spindle shaft 22 by the belt 23, and the play of the spindle shaft 22 indicated by an arrow b in FIG. 2 may occur since gaps exist between the metal bearing 24 and the washers 25 and 28. For this reason, it is necessary to prevent this play of the spindle shaft 22 by making the metal bearing 24 long along the axial direction so as to increase the span of the metal bearing 24.

However, according to the conventional bearing structures 10 and 20 described above, the following problems exist. In other words, in order to prevent the play of the spindle shaft 11 indicated by the arrow a in FIG. 1, the two radial bearings 12 and 13 must be spaced apart by a relatively long distance. In order to prevent the play of the spindle shaft 22 indicated by the arrow b in FIG. 2, the span of the metal bearing 24 must be made large. For this reason, the play of the spindle shafts 11 and 22 occur when the heights of the bearing structures 10 and 20 are made small, but on the other hand, the heights of the bearing structures 10 and 20 become large when measures are taken to prevent the play of the spindle shafts 11 and 22.

Therefore, there was a problem in that the height of the conventional bearing structures cannot be reduced to suit the requirements of equipments which are relatively thin unless the reliability of the bearing structures is sacrificed.

SUMMARY OF THE INVENTION

Accordingly, it is a general object of the present invention to provide a novel and useful bearing structure in which the problems described above are eliminated.

Another and more specific object of the present invention is to provide a bearing structure adapted to rotatably support a spindle shaft on a frame, comprising a generally circular table which is fixed to the spindle shaft in a form of a flange, a radial bearing, fixed on the frame, for rotatably supporting the spindle shaft in a radial direction of the spindle shaft, and a support member, located between the table and the frame, for rotatably supporting the table on the frame so as to support the spindle shaft in a thrust direction of the spindle shaft, the thrust direction being perpendicular to the radial direction of the spindle shaft. According to the bearing structure of the present invention, it is possible to positively support the spindle shaft in both the radial and thrust directions of the spindle shaft, thereby preventing unwanted play of the spindle shaft. In addition, the height of the bearing structure can be made small.

Other objects and further features of the present invention will be apparent from the following detailed description when read in conjunction with the accompanying drawings.

DESCRIPTION OF THE PREFERRED EMBODIMENTS

Figure 2:
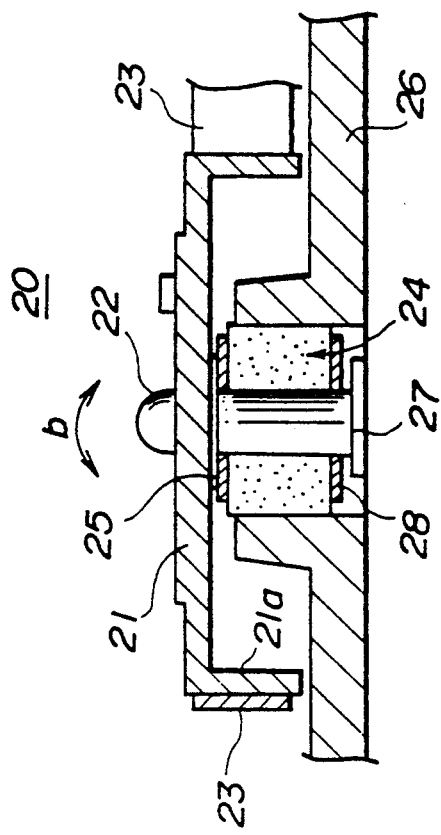
FIG. 2 is a cross sectional view showing an essential part of another example of the conventional bearing structure.
Figure 1:
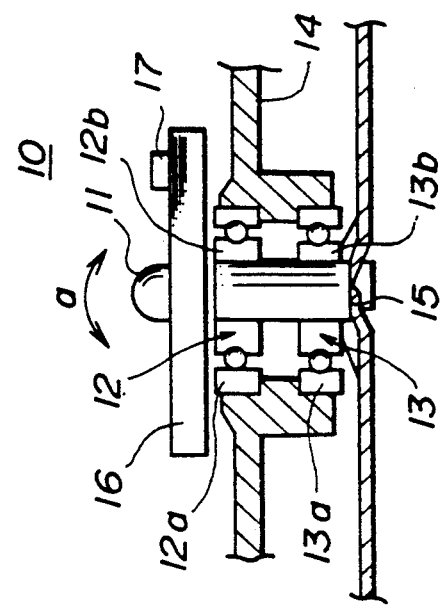
FIG. 1 is a cross sectional view showing an essential part of one example of a conventional bearing structure.
Figure 3:
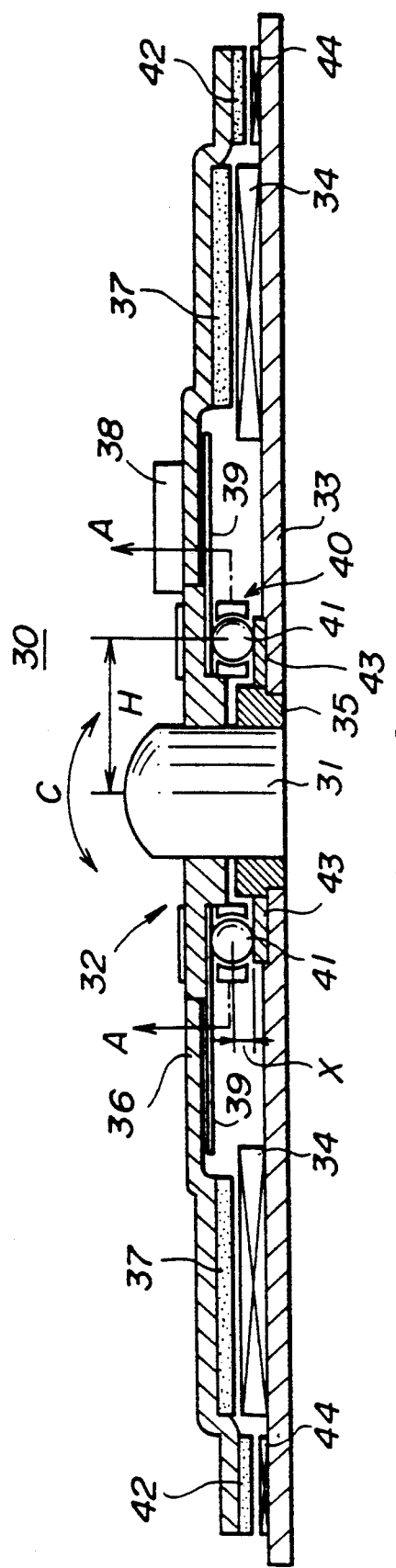
FIG. 3 is a cross sectional view showing an essential part of an embodiment of a bearing structure according to the present invention.

FIG. 3 shows an essential part of an embodiment of a bearing structure according to the present invention. In this embodiment, the present invention is applied to the so-called direct drive type bearing structure. In other words, in a bearing structure 30, a spindle shaft 31 is integrally formed on a rotary shaft of a spindle motor 32.

A frame 33 is made of an iron plate which is magnetizable. This frame 33 also functions as a stator of the spindle motor 32. A coil 34 which forms the spindle motor 32 is arranged at a predetermined position on a top surface of the frame 33.

A metal bearing 35 is provided on the frame 33. For example, this metal bearing 35 is press-fit into the frame 33 in this embodiment. The spindle shaft 31 penetrates and is supported by the metal bearing 35. The metal bearing 35 mainly receives the load of the spindle shaft 31 in the radial direction. The height of the metal bearing 35 is set small for the reasons which will be described later.

A generally circular table 36 is fixed to an upper part of the spindle shaft 31 in the form of a flange, and this table 36 rotates unitarily with the spindle shaft 31. A disk (not shown) is placed on the table 36, and this table 36 also functions as a rotor of the spindle motor 32. For this reason, a ring-shaped magnet 37 is provided on the bottom surface of the table 36 at a position confronting the coil 34. Magnets 42 are also provided on the bottom surface of the table 36 in addition to the magnet 37 which forms the spindle motor 32. The magnets 42 are located at an outermost peripheral part of the table 36. Detection coils 44 are provided on the frame 33 to confront the magnets 42 for the purpose of detecting the rotational speed of the rotor of the spindle motor 32. Outputs of the detection coils 44 are supplied to a control circuit (not shown) which controls the spindle motor 32 to a desired rotational speed. Of course, it is possible to provide only one magnet 42 and one detection coil 44.

A drive pin 38 is provided on the table 36 at a position where the disk is placed. This drive pin 38 is urged upwardly by a chuck spring 39 on the bottom surface of the table 36.

Figure 4:
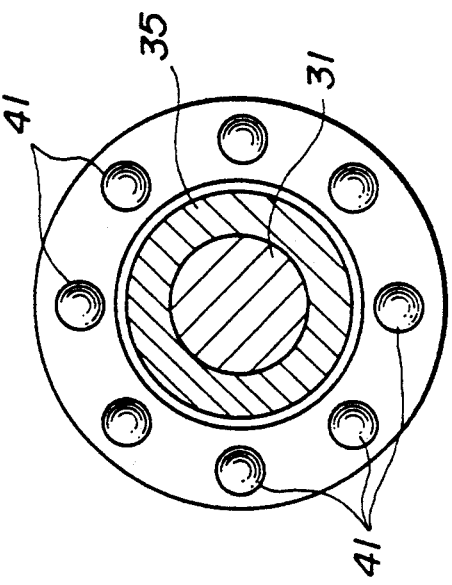
FIG. 4 is a cross sectional view showing a part of the embodiment cut along a line A—A in FIG. 3.

A support member 40 forms an essential part of this embodiment and is arranged between the frame 33 and the table 36. The structure of this support member 40 is similar to that of a retainer which is used to maintain a predetermined gap between rolling elements of a rolling bearing. The support member 40 includes a plurality of steel balls 41 which are freely rotatable, and is arranged at the outer peripheral position of the metal bearing 35. Accordingly, as shown in FIG. 4 which is a cross section cut along a line A—A in FIG. 3, the metal bearing 35 is arranged on the inner side of the support member 40.

The upper ends of the steel balls 41 make contact with the chuck spring 39 on the bottom surface of the table 36, and the lower ends of the steel balls 41 make contact with a ring-shaped plate 43 on the top surface of the frame 33. Accordingly, the frame 33 and the table 36 are prevented from wearing out by friction through direct contact with the steel balls 41, and it is unnecessary to provide a special member for preventing frictional wear. Hence, it is possible to reduce both the number of parts required and the overall height of the bearing structure 30. The table 36 is supported rotatably by the steel balls 41, and thus, the spindle shaft 31 is supported in the thrust direction by the support member 40. The thrust direction is perpendicular to the radial direction in which the metal bearing 35 supports the spindle shaft 31.

Next, a description will be given of the operation of the bearing structure 30.

According to the bearing structure 30 having the above described construction, the spindle shaft 31 is rotatably supported on the frame 33 by the metal bearing 35 and the support member 40. The metal bearing 35 supports the spindle shaft 31 in the radial direction, while the support member 40 supports the spindle shaft 31 in the thrust direction.

The height of the metal bearing 35 is set small within a range that enables sufficient reception of the load in the radial direction. As a result, play of the spindle shaft 31 may occur as indicated by an arrow c in FIG. 3, but this play is prevented by the support member 40. In addition, since the steel balls 41 of the support member 40 are arranged at positions separated by a distance H from a center axis of the spindle shaft 31, the table 36 is positively supported without play.

Furthermore, the magnet 37 which is provided on the table 36 is adjacent to the metal frame 33 via the coil 34 as may be seen from FIG. 3. For this reason, a force is applied on the spindle shaft 31 in the thrust direction by the magnetic attraction caused by the magnet 37 on the frame 33. Hence, the play of the spindle shaft 31 is also prevented by this magnetic attraction. The magnets 42 too may cause magnetic attraction of the frame 33, but the magnetic attraction generated by the magnets 42 is generally small because these magnets 42 are originally intended for rotational speed detection. However, when magnets capable of generating a sufficiently large magnetic attraction are used as the magnets 42, the magnets 42 in this case can also function to prevent play of the spindle shaft 31.

On the other hand, because the support member 40 is located on the outer side of the metal bearing 35, the support member 40 and the metal bearing 35 partially overlap when viewed from the side. Particularly, the support member 40 and the metal bearing 35 overlap by a quantity X shown in FIG. 3. Hence, the height of the bearing structure 30 can be made small since the height of the metal bearing 35 itself is small and the support member 40 and the metal bearing 35 partially overlap by the quantity X. Therefore, the spindle motor 32 which employs the bearing structure 30 can be made extremely thin, making it suitable for use in equipments which are relatively thin.

In this embodiment, the bearing structure 30 is applied to the spindle motor 32. However, the present invention is not limited to this application, and may be similarly applied to any type of equipment which requires a bearing structure.

In addition, in this embodiment, the metal bearing 35 is used to support the spindle shaft 31 in the radial direction, but other types of bearings such as a rolling bearing may be used in place of the metal bearing 35.

Moreover, the described embodiment prevents the frictional wear of the frame 33 and the table 36 by making the upper ends of the steel balls 41 contact the chuck spring 39 and the lower ends of the steel balls 41 contact the ring-shaped plate 43. However, it is not essential to provide this means for preventing the frictional wear of the frame 33 and the table 36.

The present invention is applied to the direct drive type bearing structure, but it is of course possible to similarly apply the present invention to the belt-drive type bearing structure.

Further, the present invention is not limited to these embodiments, but various variations and modifications may be made without departing from the scope of the present invention.

What is claimed is:

1. A bearing structure adapted to rotatably support a spindle shaft on a frame, said bearing structure comprising:
- a generally circular table which is fixed to the spindle shaft in a form of a flange;
- a radial bearing, fixed on the frame, for rotatably supporting the spindle shaft in a radial direction of the spindle shaft;
- a support member, located between said table and the frame, for rotatably supporting said table on the frame so as to support the spindle shaft in a thrust direction of the spindle shaft, said thrust direction being perpendicular to the radial direction of the spindle shaft, wherein said support member includes a plurality of rolling elements and a retainer for maintaining a predetermined gap between the rolling elements;
- a ring-shaped plate provided on a top surface of the frame at a position at least confronting said rolling elements of said support member, said rolling elements making contact with the ring-shaped plate; and
- a chuck spring which is provided on a bottom surface of said table, said rolling elements making contact with said chuck spring.

2. The bearing structure as claimed in claim 1, which further comprises a drive pin which projects upwardly from said table, said chuck spring urging said drive pin upwardly.

* * * * *